(12) United States Patent
Lee et al.

(10) Patent No.: US 9,437,000 B2
(45) Date of Patent: Sep. 6, 2016

(54) ODOMETRY FEATURE MATCHING

(71) Applicant: Google Inc., Mountain View, CA (US)

(72) Inventors: Johnny Lee, Mountain View, CA (US); Joel Hesch, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/185,616

(22) Filed: Feb. 20, 2014

(65) Prior Publication Data

US 2015/0235099 A1    Aug. 20, 2015

(51) Int. Cl.
*G06T 7/00* (2006.01)
*G06T 7/20* (2006.01)
*H04W 4/02* (2009.01)
*G06K 9/00* (2006.01)
*G06T 7/60* (2006.01)

(52) U.S. Cl.
CPC ......... *G06T 7/0042* (2013.01); *G06K 9/00744* (2013.01); *G06T 7/2033* (2013.01); *G06T 7/606* (2013.01); *H04W 4/023* (2013.01); *H04W 4/027* (2013.01); *H04W 4/028* (2013.01); *G06T 2207/10016* (2013.01); *G06T 2207/10028* (2013.01); *G06T 2207/30241* (2013.01); *G06T 2207/30244* (2013.01)

(58) Field of Classification Search
CPC .................. G06T 7/0081; G06T 2207/20021; G06T 7/004; G06T 7/0044; G06T 7/0083; G06T 2207/20024; G06T 7/20; G06T 7/204; G06T 7/2086; G06T 7/403; G06T 9/46; G06T 2009/4666; G06T 9/00355; G06T 9/6212; G06T 9/6267; G06T 2209/21; G06T 9/00228; G06T 7/0042; G06T 7/60; G06T 7/2033; G06T 2207/20221; G06T 7/0022; G06T 7/0028; H04W 4/02; H04W 64/00; H04W 4/023; H04W 4/021; H04W 4/027; H04W 4/04; H04W 4/025; H04W 4/028; H04W 4/043; H04W 64/003; H04W 64/006; H04W 4/026; G06K 9/46; G06K 9/00355; G06K 9/6212; G06K 9/6267; G06K 2209/21; G06K 9/00228; G06K 9/52; G06K 2009/4666; G06K 9/6215; G06K 9/00624; G06K 9/00805; G06K 9/4661; G06K 9/00335; G06K 9/00744; G06K 9/00577; G06K 9/3241; G06K 2009/3291; G06K 9/00268; G06K 9/00281; G06K 9/0061; G06K 9/3216

See application file for complete search history.

(56) References Cited

U.S. PATENT DOCUMENTS

| | | | | |
|---|---|---|---|---|
| 8,605,947 | B2 * | 12/2013 | Zhang ................ | G06K 9/00798 348/116 |
| 8,610,771 | B2 * | 12/2013 | Leung ................... | H04N 5/225 348/143 |
| 9,303,999 | B2 * | 4/2016 | Hesch .................. | G01C 21/165 |
| 2005/0189503 | A1 * | 9/2005 | Jamieson ............. | G01N 21/251 250/559.4 |

(Continued)

*Primary Examiner* — Magdi Elhag

(57) ABSTRACT

Methods and systems for determining features of interest for following within various frames of data received from multiple sensors of a device are disclosed. An example method may include receiving data from a plurality of sensors of a device. The method may also include determining, based on the data, motion data that is indicative of a movement of the device in an environment. The method may also include as the device moves in the environment, receiving image data from a camera of the device. The method may additionally include selecting, based at least in part on the motion data, features in the image data for feature-following. The method may further include estimating one or more of a position of the device or a velocity of the device in the environment as supported by the data from the plurality of sensors and feature-following of the selected features in the images.

17 Claims, 9 Drawing Sheets

(56) References Cited

U.S. PATENT DOCUMENTS

| | | | |
|---|---|---|---|
| 2008/0195304 A1* | 8/2008 | Krishnaswamy | G01S 13/867 701/532 |
| 2009/0263009 A1* | 10/2009 | Krishnaswamy | G05D 1/0253 382/154 |
| 2010/0191391 A1* | 7/2010 | Zeng | G01S 13/723 701/1 |
| 2011/0096956 A1* | 4/2011 | Aimura | B60R 1/00 382/103 |
| 2011/0222726 A1* | 9/2011 | Ruan | G06K 9/00355 382/103 |
| 2013/0201291 A1* | 8/2013 | Liu | G06F 3/012 348/47 |
| 2015/0154447 A1* | 6/2015 | Wilson | G06K 9/00624 382/103 |
| 2015/0185018 A1* | 7/2015 | Hesch | G01C 21/165 701/501 |
| 2015/0304634 A1* | 10/2015 | Karvounis | H04N 13/0239 348/46 |

* cited by examiner

ODOMETRY FEATURE MATCHING

BACKGROUND

Unless otherwise indicated herein, the materials described in this section are not prior art to the claims in this application and are not admitted to be prior art by inclusion in this section.

Sensor fusion includes combining sensor data or data derived from sensory data from independent sources such that resulting information is more complete. Data sources for a fusion process may include multiple distinct sensors. Each sensor may provide different information about the same object in an environment, or about the same location in an environment, for example. By combining the sensor data, a more complete depiction of the object or location can be provided. As an example, one sensor may include a camera to capture an image of an object, and another sensor may include location detection capabilities to determine a location of a device used to capture the image. By combining the sensor data, specific location information for the image data and device is provided.

SUMMARY

In one example, a method is provided that includes receiving, using a processor, data from a plurality of sensors of a device. The method also includes determining, based on the data, motion data that is indicative of a movement of the device in an environment. The method additionally includes as the device moves in the environment, receiving image data from a camera of the device. The method further includes selecting, based at least in part on the motion data, features in the image data for feature-following. The method further includes estimating one or more of a position of the device or a velocity of the device in the environment as supported by the data from the plurality of sensors and by feature-following of the selected features in the images.

In another example, a computer readable memory is provided that is configured to store instructions that, when executed by a device, cause the device to perform functions. The functions include receiving, at the device, data from a plurality of sensors of the device. The functions also include determining, based on the data, motion data that is indicative of a movement of the device in an environment. The functions additionally include as the device moves in the environment, receiving image data from a camera of the device. The functions further include selecting, based at least in part on the motion data, features in the image data for feature-following. The functions yet further include estimating one or more of a position of the device or a velocity of the device in the environment as supported by the data from the plurality of sensors and by feature-following of the selected features in the images.

In another example, a device is provided that comprises one or more processors, and data storage configured to store instructions that, when executed by the one or more processors, cause the device to perform functions. The functions include receiving, at the device, data from a plurality of sensors of the device. The functions also include determining, based on the data, motion data that is indicative of a movement of the device in an environment. The functions additionally include as the device moves in the environment, receiving image data from a camera of the device. The functions further include selecting, based at least in part on the motion data, features in the image data for feature-following. The functions yet further include estimating one or more of a position of the device or a velocity of the device in the environment as supported by the data from the plurality of sensors and by feature-following of the selected features in the images.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems for extracting features of interest from raw imagery received by a device that may be moving and operating in an environment (e.g., received from a camera of the device) that may allow for following of the features of interest within the raw imagery over time are provided. The features of interest may represent whole or portions of objects, corners of the image data, or points of interest in an environment defined by the image data, and may be observed over the various data frames. Based on the features of interest, a pose of the device may be updated. For example, by following a given feature of interest, an estimation of the position and the motion of the device may be made.

Example methods may be performed by a device having an application processor configured to function based on an operating system and a co-processor configured to receive data from a plurality of sensors of the device. An example method includes receiving, using a processor, data from a plurality of sensors of a device. The method also includes determining, based on the data, motion data that is indicative of a movement of the device in an environment. The method also includes as the device moves in the environment, receiving image data from a camera of the device. The method also includes selecting, based at least in part on the motion data, features in the image data for feature-following. The method also includes estimating one or more of a position of the device or a velocity of the device in the environment as supported by the data from the plurality of sensors and feature-following of the selected features in the images.

Figure 1:
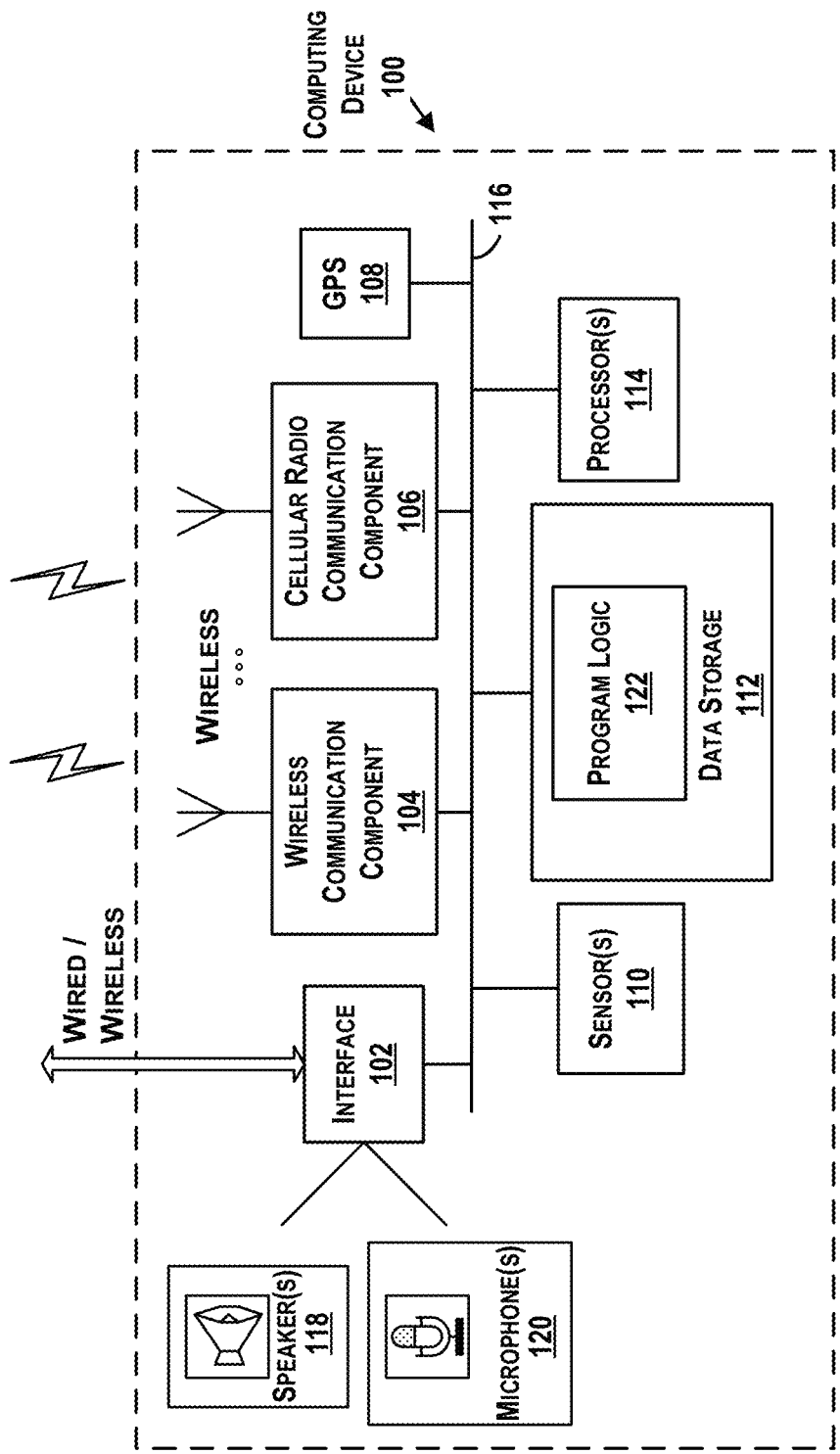
FIG. 1 illustrates an example computing device.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensors, microphone, camera(s), infrared flash, barometer, magnetometer, GPS, WiFi, near field communication (NFC), Bluetooth, projector, depth sensor, temperature sensors, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
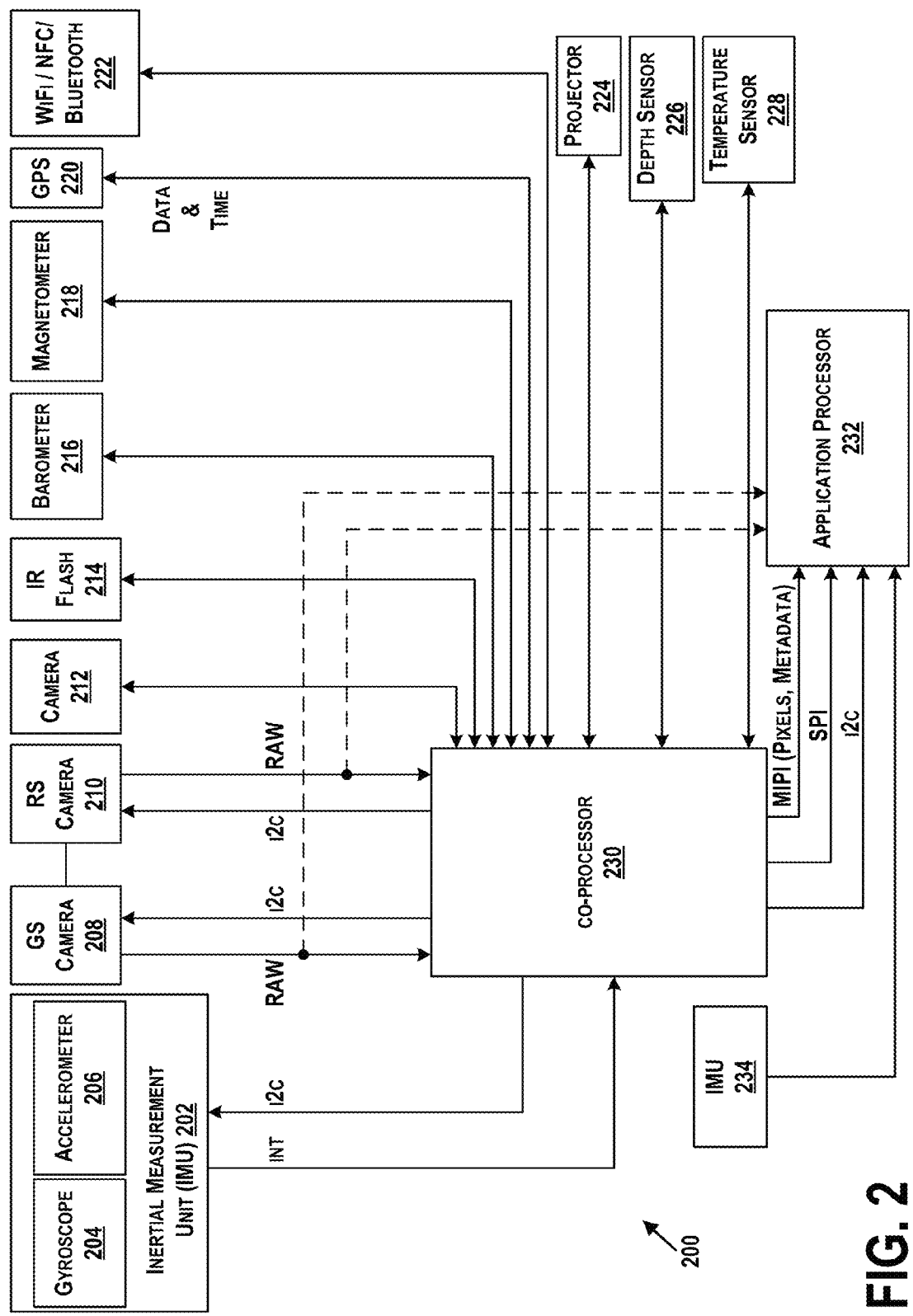
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a WiFi/NFC/Bluetooth sensor 222, a projector 224, a depth sensor 226, and a temperature sensor 228, each of which outputs to a co-processor 230. The co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be configured to capture images of a first viewpoint of the computing device 200 and the GS camera 208 and the RS camera 210 may be configured to capture images of a second viewpoint of the device that is opposite the first viewpoint. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
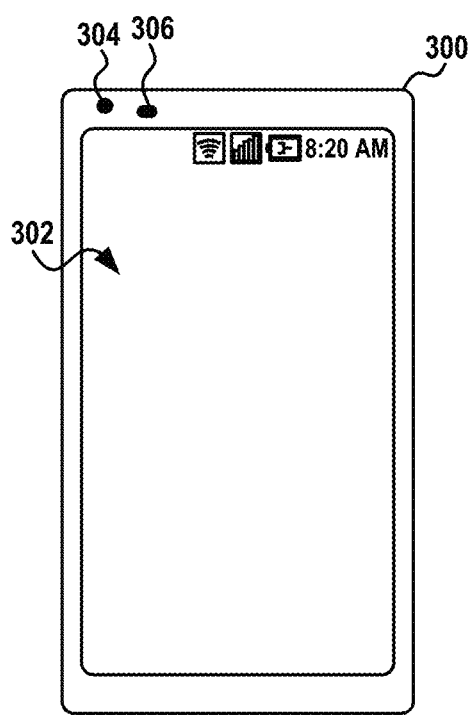
FIGS. 3A-3B are conceptual illustrations of a computing device that show a configuration of some sensors of the computing device in FIG. 2.
Figure 3B:
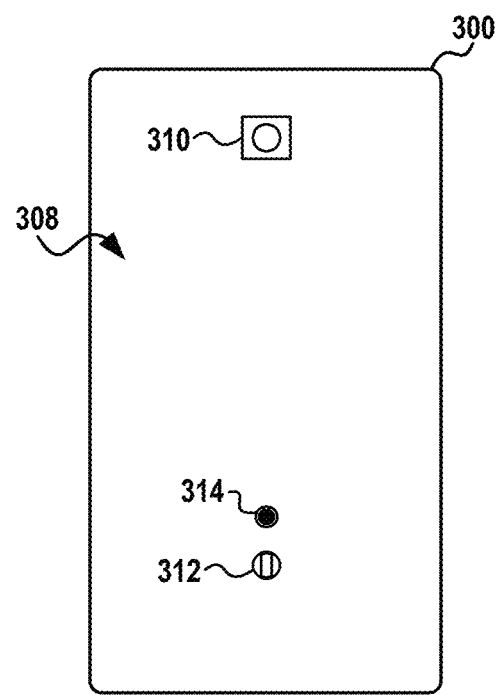

FIGS. 3A-3B are conceptual illustrations of a computing device 300 that show a configuration of some sensors of the computing device 200 in FIG. 2. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR-flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The WiFi/NFC/Bluetooth sensor 222 may include wireless communication components configured to operate according to WiFi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the separate depth sensor 226 may be configured to capture video data of the dot pattern in 3D under ambient light conditions to sense a range of objects in the environment. The projector 224 and/or depth sensor 226 may be configured to determine shapes of objects based on the projected dot pattern. By way of example, the depth sensor 226 may be configured to cause the projector 224 to produce a dot pattern and cause the RS camera 210 to capture an image of the dot pattern. The depth sensor 226 may then process the image of the dot pattern, use various algorithms to triangulate and extract 3D data, and output a depth image to the co-processor 230.

The temperature sensor 228 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Within examples herein, the computing device 200 may collect data as the computing device 200 moves through an environment, and may be configured to perform odometry functions. Odometry includes use of data from sensors that are moving to estimate a change in position over time. Odometry can be used to estimate a position of the computing device 200 relative to a starting location so as to determine a trajectory or pathway of the computing device 200. In some examples, a sliding window of sensor data can be processed as the device moves through the environment to determine a path traversed by the computing device 200.

Figure 4:
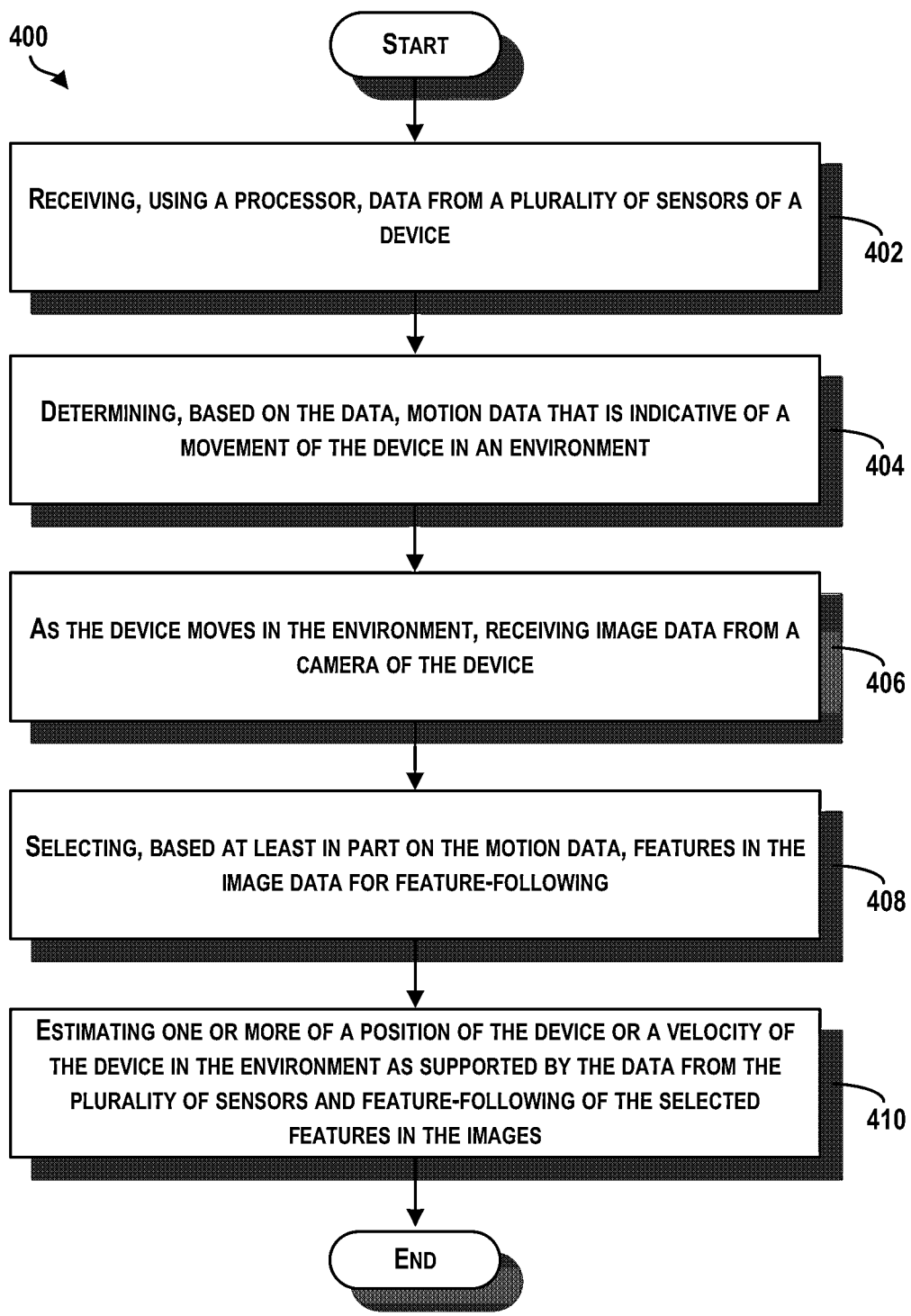
FIG. 4 is a block diagram of an example method for determining features of interest for following within image data, in accordance with at least some embodiments described herein.

FIG. 4 is a block diagram of an example method for determining features of interest for following within image data, in accordance with at least some embodiments described herein. Method 400 shown in FIG. 4 presents an embodiment of a method that, for example, could be used with the computing device 100 in FIG. 1, the computing device 200 in FIG. 2, or the computing device 300 in FIG. 3, for example, or may be performed by a combination of any components of the computing device 100 in FIG. 1, the computing device 200 in FIG. 2, or the computing device 300 in FIG. 3. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include other non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to receive information from sensors of other devices, for example. The method 400 may further be performed by a device that has an application processor configured to function based on an operating system and a co-processor configured to receive data from a plurality of sensors of the device. The sensors may include any sensors as described above in any of FIG. 1, FIG. 2, or FIGS. 3A-3B, for example, including an IMU, a global shutter camera, a rolling shutter camera, a structured light projector, a depth camera, an infrared flash, a barometer, a magnetometer, and a temperature sensor.

At block 402, method 400 includes receiving data from a plurality of sensors of a device. A processor of the device may receive the data via a number of communication buses within the device. As previously noted, the device may be the computing device 100 in FIG. 1, the computing device 200 in FIG. 2, or the computing device 300 in FIG. 3, for example.

Figure 5A:
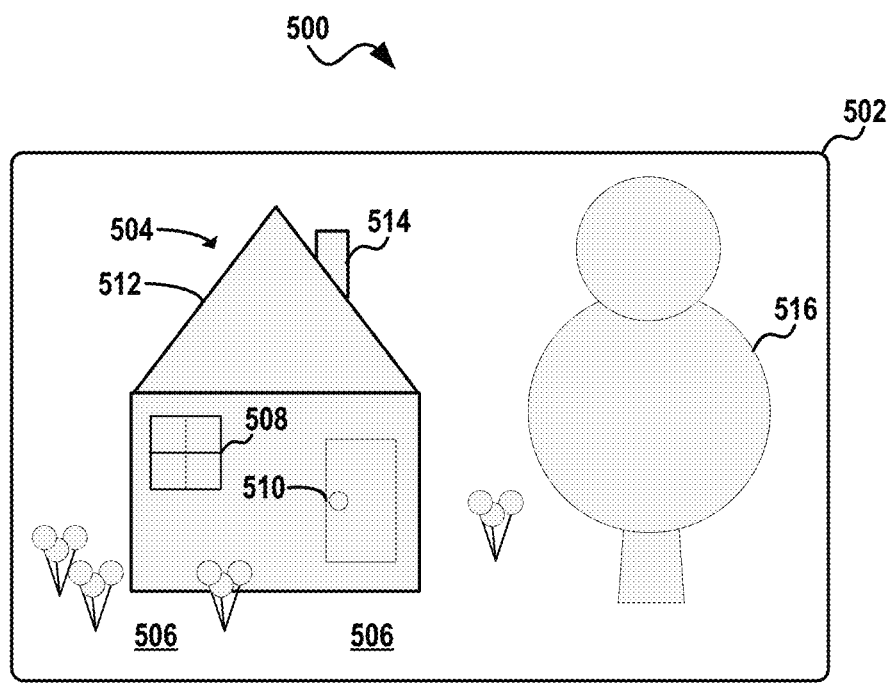
FIGS. 5A-5D are conceptual illustrations of examples for determining features for following, in accordance with at least some embodiments described herein.

The data may be representative of an environment. The environment may be any environment in which the device may be operating in, any environment in which the device is operating in proximity to, or any environment of which the device is capturing data of such as environment 500 of FIG. 5A. As shown in FIG. 5A, the device may be capturing or sensing an environment that may be indicative of the outside of a home. The environment 500 may include a house 504, a tree 516, and a yard 506, for example. The house may include a window 508, a door 510, a roof 512, and chimney 514.

The sensor data 502 may include any data indicative of environment 500 and may be received from any of the sensors described above with reference to FIGS. 1-3. Although not shown in FIG. 5A, the sensor data 502 may for example include data that may define depth, color, lighting, temperature, etc. of environment 500. To obtain the data 502, the device may be continuously scanning environment 500 as the device operates. The device may utilize a large number of scans of the environment or periodic scans of the environment using various sensors when obtaining the sensor data. Successive scans may be multiple scans by various sensors occurring over time and may be continuous or may occur in intervals.

The sensor data 502 may encompass various types of data and data structures, may be of various file formats, and may be stored to various mediums, whether those types of data, file formats, and mediums are known or have yet to be developed. For example, the sensor data 502 may include one or more digital photographs or one or more digital graphics that may represent environment 500, as is shown in FIG. 5A. In other examples, the sensor data may include data received from an inertial measurement unit (IMU) of the device. The data received from the IMU may include data indicative of a position of the device as it receives the data indicative of environment 500. This data may be updated as the device moves and operates to receive data. For example, the data may indicate a position of the device using three degrees of freedom (e.g., along x axis, y axis, and z axis) and an orientation of the device using three degrees of freedom (e.g., roll, pitch, yaw). The data may be collected by the IMU over any given time period, and in some examples, the IMU may continuously collect data.

At block 404, the method 400 includes determining based on the data, motion data that is indicative of a movement of the device in the environment. To determine the motion data, a processor of the device may process the received sensor data and mine the desired information from the received data. For instance, a processor may process information associated with the received sensor data to determine information including a file type in which the data is stored, a type of the data, a sensor that collected the data, and a timestamp for when the data was received. Using the information returned from the processing, the processor may use the information to help determine a specific movement associated with the device.

In one example, the plurality of sensors of the device may include an IMU and the data received at block 402 may include data sensed by the IMU. Accordingly, at block 404, when processing the data, the processor may determine the motion data, for example, by searching for or determining what data within the received data corresponds to the IMU.

For example, using the data received from the IMU a processor of the device may for the six degrees of freedom (e.g., x, y, z and $\theta_x$, $\theta_y$, and $\theta_z$) integrate acceleration data received from the IMU unit over time to determine a velocity of the device. In another example, the processor may further integrate the velocity to determine a position. As a specific example, based on processing the IMU data, the processor may, for example, detect that the device traveled westward for an hour at an average speed of 1.5 miles per hour, and then the processor may determine that the device is about 1.5 miles west of its initial position or some starting, known, or reference position. The processor may determine an estimation of motion to be a path that the device traveled over the time period, for example. The estimation of motion may be along any of the six degrees of freedom (e.g., x, y, z and $\theta_x$, $\theta_y$ and $\theta_z$, or along a combination of any of the degrees of freedom. The estimation of motion may be in terms of changes in acceleration, velocity, position, or any combination of such factors.

In another example, the plurality of sensors of the device may include a depth sensor and the data received may include data sensed by the depth sensor. When processing the data, the processor may parse out the data received from the depth sensor and may estimate a motion and associated depth of the motion. In yet further examples, the plurality of sensors may include a gyroscope or other, similar sensor configured to measure angular movement, and the received data may include data indicative of angular motion. In similar form to the processing noted above, a processor of the device may process the received data to determine the data indicative of the angular motion, and using that data, the processor of the device may estimate an angle of movement of the device.

Note the example motion data described above are not intended to be limiting, and other, similar motion data may be determined at block 404. The data may be indicative of any motion (e.g., an azimuth motion) of the device and may include any data sensed by any of the sensors described above with regard to FIGS. 1-3. Additionally, the determined motion data need not include only one type of motion data and may, at times, include some or all of the data described above.

At block 406, method 400 includes as the device moves (or operates) in the environment, receiving image data from a camera(s) of the device. In some examples, the image data may be captured at the same time as the data received from the plurality of sensors as described at block 402 and may be included in the sensor data received at block 402. The image data may be received, for example, using a camera the same as or similar to cameras 208, 210, and 212 discussed with regard to FIG. 2. In one example, where the device includes a mobile phone having a rear facing camera, the camera may capture images of environment 500 within a field of view of the device. In other examples where the device includes both a rear and a front facing camera, one or both cameras may be configured to capture images of environment 500. Any amount of image data may be captured, and in some examples, the camera may also be configured to capture live video during the time window, and frames of the video may be taken as images.

For example, the device may capture an image of environment 500, as shown in FIG. 5A, that may be included in the sensor data 502. The image may include image data indicative of the characteristics of environment 500 including, for example, the house 504, the tree 516, the yard 506, the window 508, the door 510, the roof 512, and the chimney 514. In some examples, the image data may also include a plurality of frames of image data that is indicative of the environment (e.g., shown as 520, 522, and 524 in FIG. 5B). Taken together, the plurality of frames of image data may be indicative of a time period during which the image data was acquired. For instance, the plurality of frames of image data may include image data that may be obtained at different times within 1-3 seconds while the device is moving and operating within environment 500, and may include a combination of data collected by various sensors of the device (such as any data described as being collected by sensors of the device 100 in FIG. 1 or device 200 of FIG. 2, for example) and image data collected from a camera of the device. Alternatively, although not shown in FIG. 5B, the plurality of frames of image data may be indicative of a range/depth within which the sensor data was acquired.

Once the image data is captured, at block 408, method 400 includes selecting features in the image data for feature following. The features may be selected based on the motion data determined at block 404. Generally, the image data can be processed based on the motion data to identify a set of features, or points in the images that a feature following (or tracking) algorithm can lock onto and follow through multiple frames of data. Example features points may be points in the image that are unique, bright/dark spots, or edges/corners depending on the particular tracking algorithm. For instance, an edge may include a point in an image where there is a boundary between two image regions, and a corner may refer to point-like feature in an image that has a local two-dimensional structure.

Determining the set of features for following may be performed in various manners. In one example, a processor of the device may determine a direction of gravity (or gravity vectors) with respect to an orientation of the device based on the motion data. For instance, the processor may analyze or process data received from an IMU of the device and based on acceleration data received from the IMU determine the direction of gravity. Using this information, vertical lines in the image data may be determined as lines that are parallel to the direction of gravity and horizontal lines in the image data may be determined as lines that are perpendicular to the direction of gravity. Thereafter, the set of features may include the determined vertical lines or horizontal lines as needed.

Figure 5B:
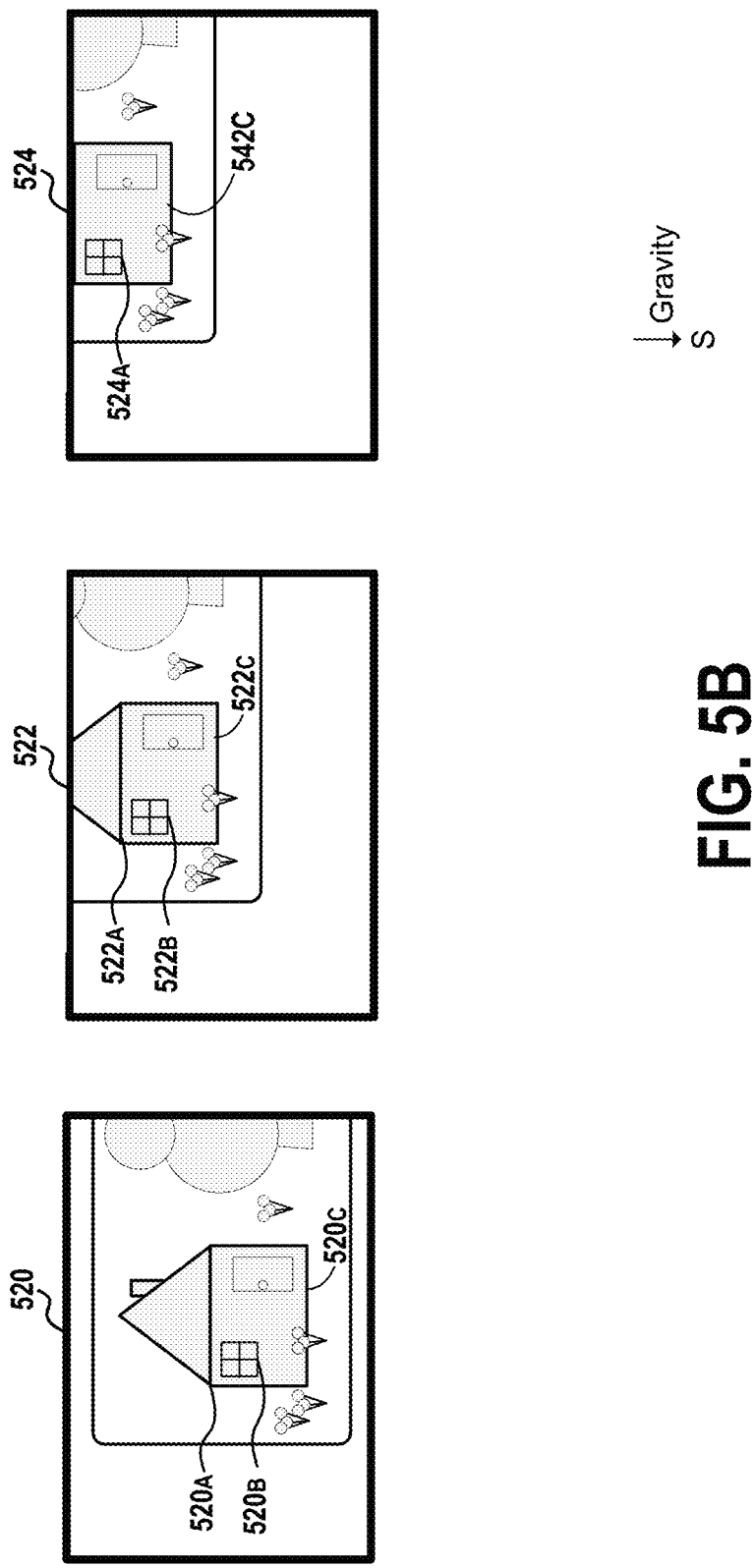

For instance, referring to FIG. 5B, a device may receive data indicative of environment 500 from a plurality of sensors and the data may include image data 520, 522, and 524 of environment 500. Based on the data received, the device may determine that the direction of gravity is in a southward, down direction (indicated by the arrow in FIG. 5B). Based on this determination, the device may determine horizontal lines (e.g., lines that are perpendicular to the direction of gravity) of data 520 indicative of environment 500 such as lines 520A (bottom of the roof), 520B (bottom of the window), and 520C (bottom of the house). By following these feature lines through the various frames of data, in which 522A, 522B, and 522C and 524A and 524C correspond to 520A, 520B, and 520C, in their respective frames, the device may use this information to help estimate how the device moved, which will be described in greater detail below. Alternatively, instead of horizontal lines vertical lines may be determined for following or, in some cases, both horizontal and vertical lines may be moved for following.

In other examples, the set of features may be determined based on motion data indicative of the device remaining still or, in other words, the movement of the device may include being held steady. In such circumstances, the set of features for following may be determined by partitioning or dividing the image data and selecting features across the partitions in a uniform manner. For instance, the image data may be split into quadrants or sections and features may be selected from each quitrent in a manner such that the each quadrant or section has the same number of features for following. Alternatively, features may be selected from each quadrant based on a threshold. For instance, features may be selected in each quadrant until each quadrant includes a number of features over a minimum threshold. In some examples, such as when a device operates a wide-angle view camera, the image data may be partitioned into sections based on angles instead of quadrants. In other examples, image data may be partitioned based on a depth associated with the motion data. Regardless of the manner in which the image data is partitioned, the features for following may be selected from each partition based on a threshold.

Figure 5C:
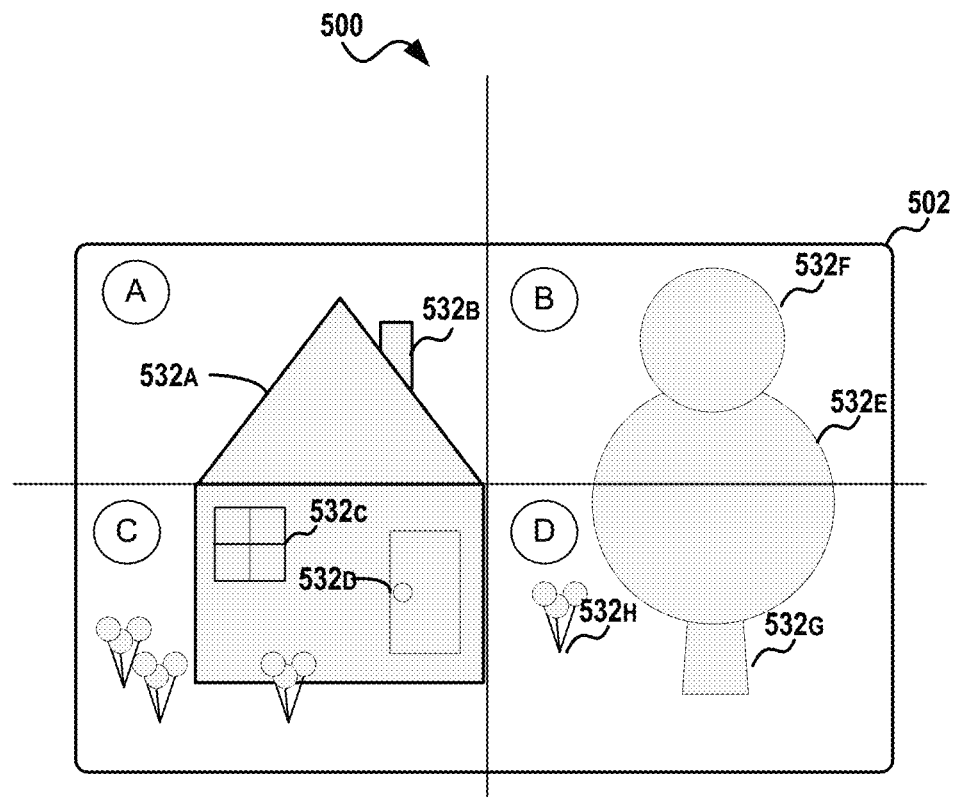

For example, referring to FIG. 5C, the image data 502 may be partitioned into four quadrants A, B, C, and D. In attempt to ensure uniformity and that enough features are obtained to help predict an accurate movement of the device, features may be selected from each quadrant of the image data. For instance, in the example shown in FIG. 5C, two features may be selected from each quadrant A (532A and 532B), B (532E and 532F), C (532C and 532D) and D (532G and 532H) of the image data 502 for following. Accordingly, as the selected features move over various frames of data (e.g., shown in FIG. 5B) each quadrant will have two features that may be used to follow, and ultimately aid in determining an accurate movement of the device.

In yet another example, the set of features may be determined based on an uncertainty associated with the movement of the device. Similar to the other methods that may be used to determine the set of features, the uncertainty may be determined by processing the motion data estimated at block 404. For instance, after processing the motion data, a processor of the device may determine that the device has executed a movement to change a pitch or a roll of the device, but may be uncertain as to the exact measurements of that movement (e.g., the processor may not be able to determine a degree or extent of the change in pitch or roll). Because pitch and roll of the device may cause horizontal lines to move (seemingly move from the perspective of a field of view of the device) in the environment when the device is performing a pitch or a roll maneuver, the set of features selected may correspond to horizontal lines in the environment. Similarly, the set of features may be determined based on an uncertainty associated with a yaw movement of the device. Because yaw movements may cause vertical lines to move (seemingly move from the perspective of a field of view of the device) in the environment when the device is performing a yaw maneuver, the set of features selected may correspond to vertical lines in the environment.

Figure 5D:
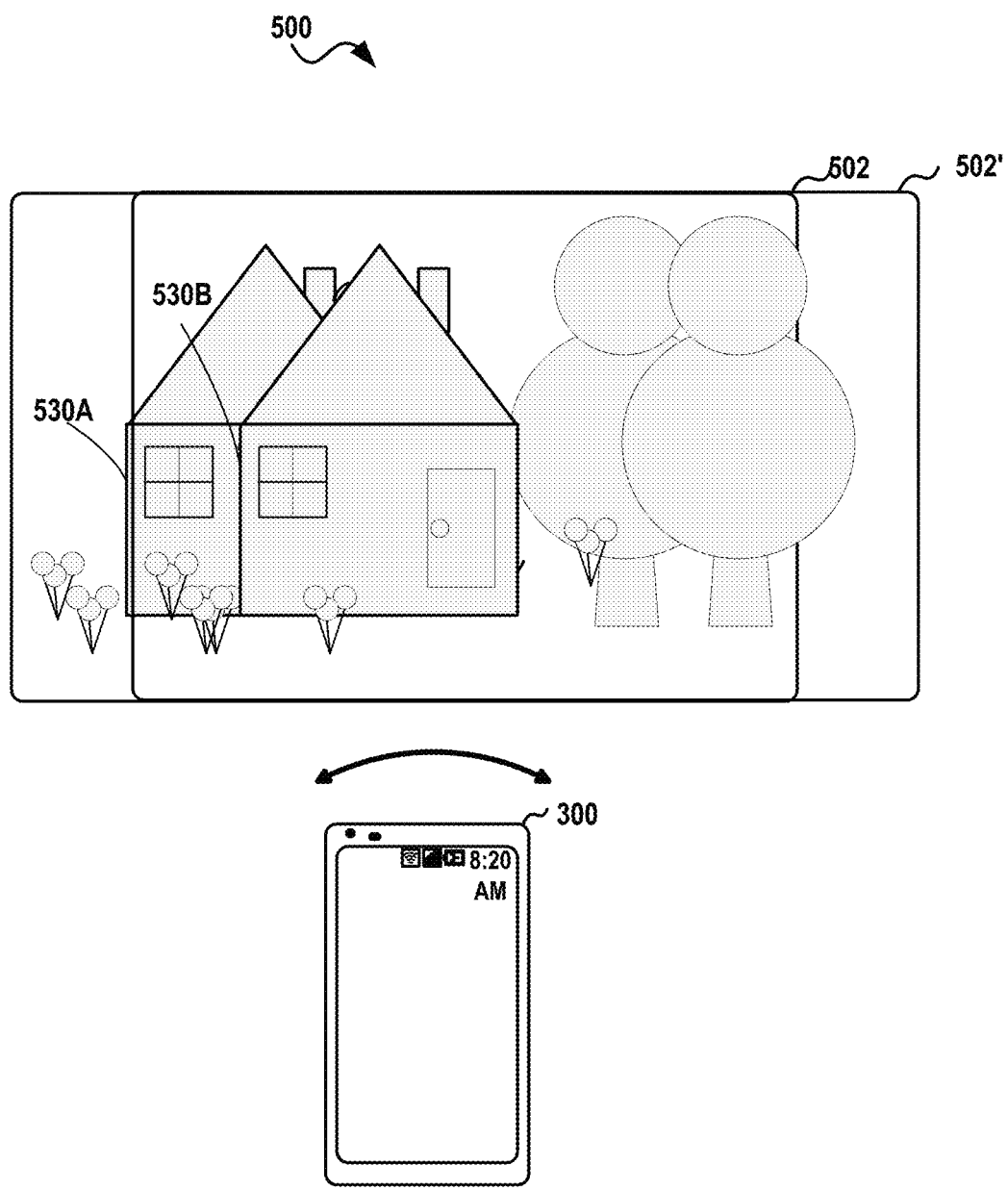

For example, as shown in FIG. 5D, as device 300 moves in a manner that changes the yaw (shown by the curved arrow) of the device, vertical lines may appear to be moving relative to the device. Accordingly, vertical lines such as line 530A, a left wall of the house, may be selected as a feature of interest for following. Then, upon following vertical line 530A as the device moves in a western (or left) heading, for example, vertical line 520A of data 502 may move to a new position, shown as 530B in frame of data 502' of FIG. 5D. Using the distance, between, the two vertical lines 530A and 530B, for example, a processor of the device may be able to estimate an extent and direction of the yaw motion.

In yet further examples, the set of features may be determined based on an uncertainty of the position of the device as it captures the data. In such an instance, the set of features may be determined based on points in the image data close to the device that have a certain threshold of parallax. In other examples, the features may be determined based on the environment itself and shapes of the environment. For example, referring to the environment illustrated in FIG. 5A, knowing the house 504 includes certain component such as a window 508 and door 510, a processor may determine that the door and the window to serve as features for following and track several features (e.g., horizontal lines, color, etc.) of components to ensure those features can be adequately followed. Additionally, in some environments, uncertainty associated with the environment may be used to determine features for following. For example, referring to FIG. 5A, if a portion of the environment 500 is uncertain (e.g., an area behind tree 514) then features in that portion may be selected for following.

Note the examples described above are not intended to be limiting, and other, similar methods may be used to determine features for following at block 408. The methods chosen may be any method that utilizes the motion data to help determine which features to follow.

Once the set of features for following have been determined, any feature tracking algorithm may be used to follow the features. For example, an edge detection technique may identify points in a digital image at which image brightness changes sharply or has discontinuities. The points at which image brightness changes sharply can be organized into a set of curved line segments termed edges. Edge detection may be applied to detect and follow the vertical and horizontal lines, for example. Corner detection is another approach used within computer vision systems to extract certain kinds of features and infer contents of an image, and a corner can be defined as an intersection of two edges. A corner can also be defined as a point for which there is two dominant and different edge directions in a local neighborhood of the point. Other feature detection methods include, blob detection, which refers to methods that are aimed at detecting regions in a digital image that differ in properties, such as brightness or color, compared to areas surrounding those regions. The corner and other detection methods may be used to, for example, detect particular aspects of the image data such as the window 508 of data 502.

Algorithms such as the Harris & Stephens algorithm can be used to detect edges and corners. Still other methods may be used as well, such as feature detection from the Accelerated Segment Test (FAST) algorithm to detect corners and interest points, for example. Furthermore, features such as blobs may describe regions of interest in an image (e.g., regions that are too smooth to be detected by a corner detector), and the FAST algorithm, among others, can also be used to detect blobs as well.

One example feature tracking method includes the Kanade-Lucas-Tomasi (KLT) feature tracker method. In one instance, features are located by examining a minimum eigenvalue of each 2 by 2 gradient matrix of the image, and features can be tracked using a Newton-Raphson method of minimizing a difference between two windows of the images.

At block 410, the method 400 includes estimating one or more of a position of the device or a velocity of the device in the environment as supported by the data from the plurality of sensors and feature-following of the selected features in the images. For example, the processor can determine an estimation of motion of the device based on the image data captured by the camera and the various features followed within the image data. In some examples, the processor may improve upon the motion data to make the estimation.

Once a feature is identified in consecutive images, an estimate of the motion of the device can be determined due to movement of the feature in the images. For example, if the feature is of a static object, then movement of the feature within the images is due to movement of the device. In some examples, movement of features in the images between consecutive images can be determined and associated as movement of features representing a moving object in the images. When the features represent a moving object, the movement of features between images may not be due to movement of the device (or may be due to movement of the object and movement of the device), and thus, the feature tracking methods may not be accurate. As a result, features other than those associated with the moving object can be used for the feature tracking. When the features are associated with a static object, the features may be used for the feature tracking.

In another example, a pose or orientation of the camera of the device for the sliding time window can be determined based on the overall estimation of motion of the device. The IMU data may indicate yaw, pitch, and roll of the device, and the camera is in a fixed position with respect to the device. Thus, using the fixed relative position of the camera and the IMU data, an orientation of the camera can be determined. This may be helpful, for example, in instances in which features in the images may be representative of objects upside down or otherwise angled with respect to the camera, and the pose/orientation can be used to translate the images to be upright for feature tracking purposes.

Figure 6:
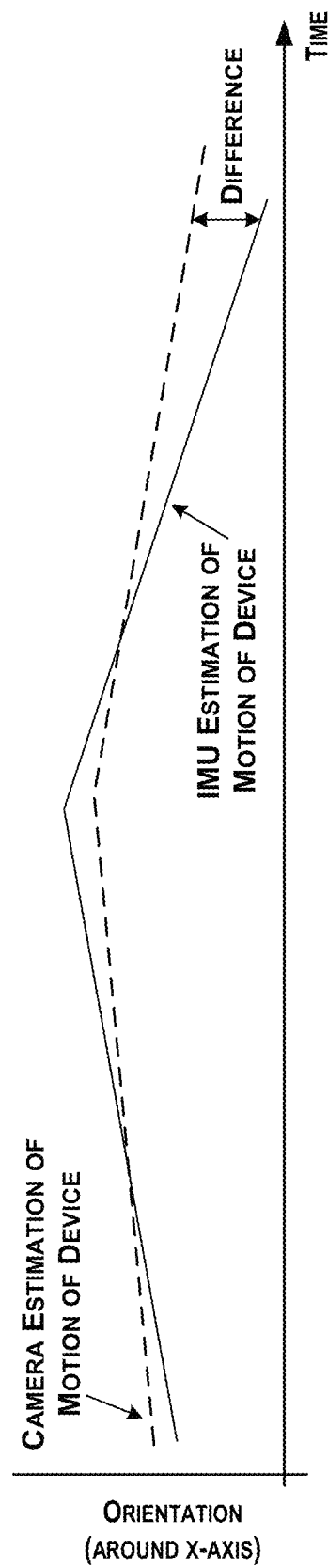
FIG. 6 is a conceptual illustration of example estimations of motion of the device based on camera images and IMU data, in accordance with at least some embodiments described herein.

FIG. 6 is a conceptual illustration of example estimations of motion of the device based on camera images and IMU data. As shown in FIG. 6, an example camera estimation of motion of the device has been determined using feature tracking of features in images (such as tracking the horizontal line features in consecutive images shown in FIG. 5B). The estimation of motion is shown as a relative position along an x-axis over time. The graph further shows an estimation of motion of the device based on the IMU data, which varies at times from the camera estimation as shown by the difference. The difference may be tested at any time over the time scale, or at multiple instances along the time scale, or at a beginning and ending of a sliding time window, for example, so as to determine if the difference exceeds the threshold. Exceeding the threshold can be based on exceeding just once, exceeding at many times, etc., based on a desired accuracy of the estimations. In examples where the difference is larger than a threshold amount and exceeds a preset threshold (both in terms of magnitude and instances of threshold being exceeded), additional positional data can be determined.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, using a processor, data from a plurality of sensors of a device;
   determining, based on the data, motion data that is indicative of a movement of the device in an environment;
   as the device moves in the environment, receiving image data from a camera of the device;
   selecting, based at least in part on the motion data, features in the image data for feature-following; and
   estimating one or more of a position of the device or a velocity of the device in the environment as supported by the data from the plurality of sensors and by feature-following of the selected features in the image data:
   wherein the plurality of sensors includes an inertial measurement unit (IMU),
   wherein the motion data includes data received from the IMU that is indicative of a direction of gravity being applied to the device, and
   wherein selecting features in the image data for feature-following comprise:
      identifying one or more vertical lines in the image data as a line that is parallel to the direction of gravity or one or more horizontal lines in the image data as a line that is perpendicular to the direction of gravity; and
      providing the identified one or more vertical lines or the identified one or more horizontal lines as a given feature for feature-following.

2. The method of claim 1,
   wherein the plurality of sensors further includes a depth sensor,
   wherein the motion data includes data received from the depth sensor that is indicative of a plurality of depths associated with the movement of the device, and
   wherein selecting features in the image data for feature-following further comprises:
      determining, based on respective depths of the plurality of depths associated with the movement of the device, a plurality of cells in the image data that are divided by respective depths of the plurality of depths; and
      based on a given cell of the plurality of cells including a number of features less than a threshold number of features, selecting features for feature-following that correspond to the given cell.

3. The method of claim 1,
   wherein selecting features in the image data for feature tracking further comprises:
      determining, based on the image data, a plurality of sections of the image data; and
      based on a given section of the plurality of sections including a number of features less than a threshold number of features, selecting features for feature-following that correspond to the given section.

4. The method of claim 3, wherein respective sections of the plurality of sections are defined based on quadrants associated with the image data.

5. The method of claim 3,
   wherein the camera comprises a wide-angle view camera, and
   wherein respective sections of the plurality of sections are defined based on angles associated with the image data.

6. The method of claim 1, further comprising:
   receiving, using the processor, environmental data from the plurality of sensors of the device, wherein the environmental data includes shape data that defines one or more shapes of objects in the environment; and
   selecting, based at least in part on the shape data, the features in the image data for feature-following.

7. The method of claim 1, further comprising:
   determining, based on the motion data, an uncertainty of movement of the device that defines a level of uncertainty of a portion of the movement of the device; and
   selecting, based on the uncertainly of movement of the device, the features in the image data for feature-following.

8. The method of claim 7,
   wherein the uncertainty of movement of the device comprises an uncertainty of a roll or a pitch of the device, and
   wherein selecting the features in the image data for feature-following comprises selecting the identified one or more horizontal lines for feature-following.

9. The method of claim 7,
   wherein the uncertainty of movement of the device comprises an uncertainty of a yaw of the device, and
   wherein selecting the features in the image data for feature-following comprises selecting the identified one or more vertical lines for feature-following.

10. A non-transitory computer readable memory configured to store instructions that, when executed by a device, cause the device to perform functions comprising:
    receiving, at the device, data from a plurality of sensors of the device;
    determining, based on the data, motion data that is indicative of a movement of the device in an environment;
    as the device moves in the environment, receiving image data from a camera of the device;
    selecting, based at least in part on the motion data, features in the image data for feature-following;
    estimating one or more of a position of the device or a velocity of the device in the environment as supported by the data from the plurality of sensors and by feature-following of the select features in the image data; and
    wherein the plurality of sensors includes an inertial measurement unit (IMU),
    wherein the motion data includes data received from the IMU that is indicative of a direction of gravity being applied to the device, and
    wherein selecting features in the image data for feature-following comprise:
       identifying one or more vertical lines in the image data as a line that is parallel to the direction of gravity or one or more horizontal lines in the image data as a line that is perpendicular to the direction of gravity; and providing the identified one or more vertical lines or the identified one or more horizontal lines as a given feature for feature-following.

11. The non-transitory computer readable memory of claim 10, wherein the plurality of sensors includes a depth sensor, wherein the motion data further includes data received from the depth sensor that is indicative of a plurality of depths associated with the movement of the device, and wherein selecting features in the image data for feature-following further comprises:

determining, based on respective depths of the plurality of depths associated with the movement of the device, a plurality of cells in the image data that are divided by respective depths of the plurality of depths; and based on a given cell of the plurality of cells including a number of features less than a threshold number of features, selecting features for feature-following that correspond to the given cell.

12. The non-transitory computer readable memory of claim 10, wherein selecting features in the image data for feature-following further comprises:

determining, based on the image data, a plurality of sections of the image data; and based on a given section of the plurality of sections including a number of features less than a threshold number of features, selecting features for feature-following that correspond to the given section.

13. The non-transitory computer readable memory of claim 10, further comprising:

receiving, using the device, environmental data from the plurality of sensors of the device, wherein the environmental data includes shape data that defines one or more shapes of objects in the environment; and selecting, based at least in part on the shape data, the features in the image data for feature-following.

14. The non-transitory computer readable memory of claim 10, further comprising:

determining, based on the motion data, an uncertainty of movement of the device that defines a level of uncertainty of a portion of the movement of the device; and selecting, based on the uncertainly of movement of the device, the features in the image data for feature-following.

15. A device comprising:

one or more processors; and data storage configured to store instructions that, when executed by the one or more processors, cause the device to perform functions comprising:

receiving data from a plurality of sensors of the device;

determining, based on the data, motion data that is indicative of a movement of the device in an environment;

as the device moves in the environment, receiving image data from a camera of the device;

selecting, based at least in part on the motion data, features in the image data for feature-following; and estimating one or more of a position of the device or a velocity of the device in the environment as supported by the data from the plurality of sensors and by feature-following of the selected features in the image data;

wherein the plurality of sensors includes an inertial measurement unit (IMU), wherein the motion data includes data received from the IMU that is indicative of a direction of gravity being applied to the device, and wherein the function of selecting features in the image data for feature-following comprise:

identifying one or more vertical lines in the image data as a line that is parallel to the direction of gravity or one or more horizontal lines in the image data as a line that is perpendicular to the direction of gravity; and providing the identified one or more vertical lines or the identified one or more horizontal lines as a given feature for feature-following.

16. The device of claim 15, wherein the functions further comprise:

receiving, using the one or more processors, environmental data from the plurality of sensors of the device, wherein the environmental data includes shape data that defines one or more shapes of objects in the environment; and selecting, based at least in part on the shape data, the features in the image data for feature-following.

17. The device of claim 15, wherein the functions further comprise:

determining, based on the motion data, an uncertainty of movement of the device that defines a level of uncertainty of a portion of the movement of the device; and selecting, based on the uncertainly of movement of the device, the features in the image data for feature-following.

* * * * *

UNITED STATES PATENT AND TRADEMARK OFFICE
CERTIFICATE OF CORRECTION

PATENT NO. : 9,437,000 B2
APPLICATION NO. : 14/185616
DATED : September 6, 2016
INVENTOR(S) : Johnny Lee et al.

Page 1 of 1

It is certified that error appears in the above-identified patent and that said Letters Patent is hereby corrected as shown below:

In the Claims

At Column 15, Line 35, please correct "feature-following comprise:" to be -- feature-following comprises: --

At Column 16, Line 60, please correct "following comprise:" to be -- following comprises: --

At Column 18, Line 48, please correct "the uncertainly of" to be -- the uncertainty of --

Signed and Sealed this
Second Day of July, 2019

Andrei Iancu
*Director of the United States Patent and Trademark Office*